United States Patent [19]

Teraoka

[11] 4,207,955

[45] Jun. 17, 1980

[54] DISPLAY HOLDING DEVICE IN ELECTRONIC DIGITAL DISPLAY TYPE SCALE

[75] Inventor: Kazuharu Teraoka, Tokyo, Japan

[73] Assignee: Teraoka Seikosho Co., Ltd., Japan

[21] Appl. No.: 968,086

[22] Filed: Dec. 11, 1978

[30] Foreign Application Priority Data

Dec. 23, 1977 [JP] Japan .................................. 52-173674
Feb. 28, 1978 [JP] Japan .................................. 53-25565
Feb. 28, 1978 [JP] Japan .................................. 53-25566
Jul. 31, 1978 [JP] Japan .................................. 53-105123

[51] Int. Cl.² .......................................... G01G 23/37
[52] U.S. Cl. ................................ 177/25; 177/DIG. 3; 364/466
[58] Field of Search ........................... 177/25, DIG. 3; 364/466, 567

[56] References Cited

U.S. PATENT DOCUMENTS 3,770,069 11/1973 Loshbough ............................ 177/25
4,008,776 2/1977 Kushmuk .......................... 177/210 R Primary Examiner—Joseph W. Hartary
Attorney, Agent, or Firm—Kane, Dalsimer, Kane, Sullivan and Kurucz

[57] ABSTRACT

In a display holding device for an electronic digital display type scale, when a part of a first load applied to the weighing section is removed therefrom, a hold signal is automatically outputted so that the data representative of the weight, price, etc., of the first load, which have been displayed by the data display sections before the removal of the part of the first load, are maintained displayed for a predetermined period of time, and displaying the data is released automatically, or when a predetermined key is operated, or when a second load is nextly applied to the weighing section.

16 Claims, 3 Drawing Figures

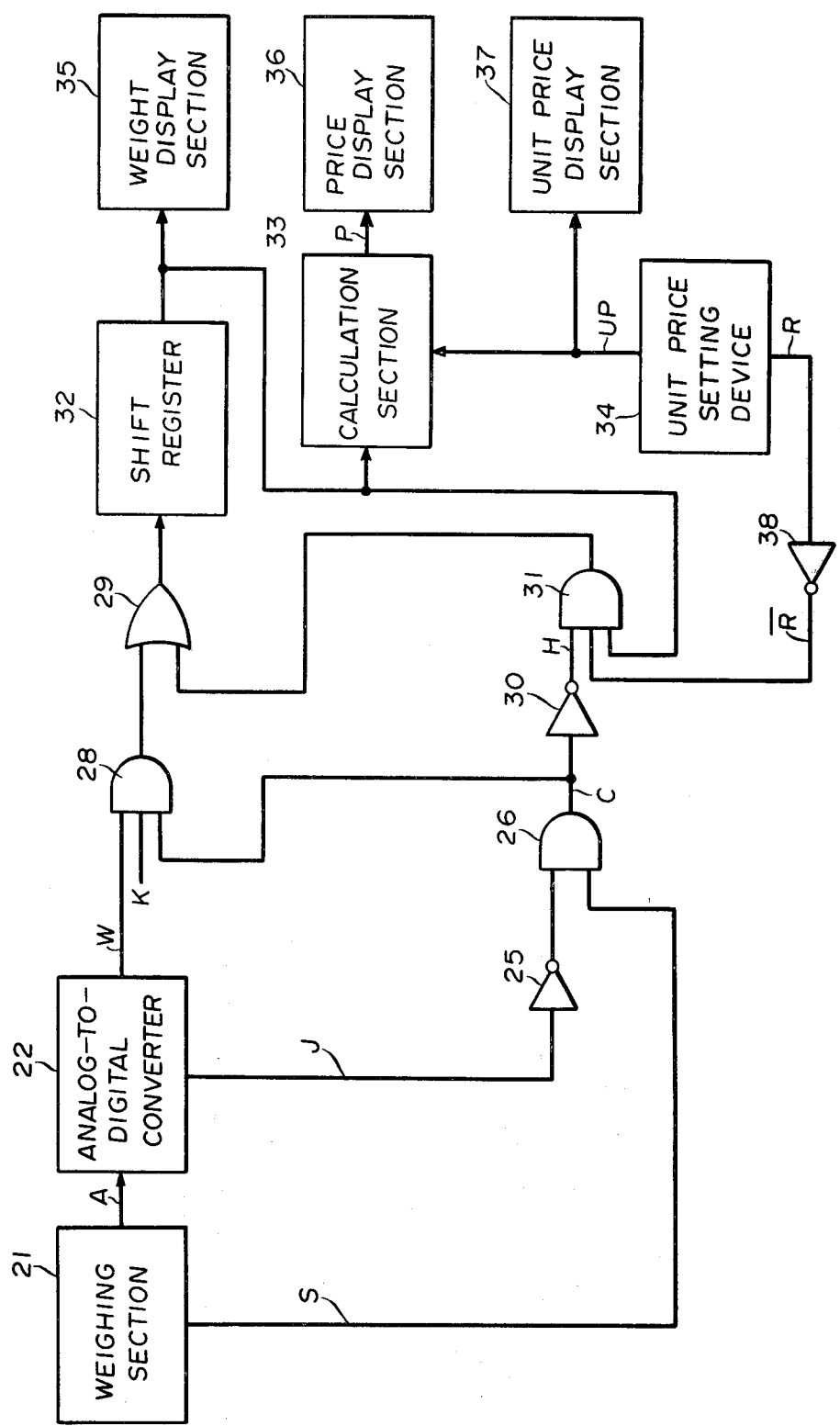

DISPLAY HOLDING DEVICE IN ELECTRONIC DIGITAL DISPLAY TYPE SCALE

BACKGROUND OF THE INVENTION

This invention relates to electronic digital display type scales in which the weight of a load applied to the weighing section is converted into an electrical signal so that various data representative of, for instance, the weight and price of the load are displayed by the data display means, and more particularly to a display holding device in an electronic digital display type scale of this type, in which after the removal of the load, the data concerning the load are held and displayed for a predetermined period of time.

In a conventional electronic digital display type scale, if a part or all of a load applied to the weighing section is removed, then the data (weight and price) of the load which have been displayed on the display section is changed to new data such as zero or other than zero. Therefore, in the case where it is required for the operator to carry out the calculation of, for instance, change after the removal of the load from the scale, he has to perform the calculation according to the data which has been displayed on the display section until the removal of the load and memorized by him. Accordingly, the conventional electronic digital display type scale is disadvantageous in that he may make a mistake in memorizing the data of the load which leads to a mistake in such a calculation.

In order to overcome this difficulty, an electronic digital display type scale provided with a display holding device adapted to hold and display the data concerning a load applied thereto for a predetermined period of time after the removal of the load has been proposed in the art.

In a conventional display holding device of this type, data representative of the weight, price, etc. of a load applied to its weighing section are maintained displayed on the data display means by operating a button or the like. However, in this conventional display holding device, it is necessary to operate the button again to eliminate the data thus held on the data display means. Accordingly, the conventional display holding device is disadvantageous in that the following weighing operation cannot be carried out without operating the button; that is, the button must be operated for every weighing operation, which is undoubtedly troublesome for the user and lowers the efficiency of the weighing operation.

SUMMARY OF THE INVENTION

Accordingly, a first object of this invention is to provide a display holding device for an electronic digital display type scale, in which upon removal of a load from its weighing section, the data representative of the weight, price, etc. of the load, which have been displayed by the data display means, are automatically held to be displayed for a predetermined period of time, whereby the weighing operation of loads can be readily and efficiently carried out without particular additional operations.

A second object of the invention is to provide a display holding device for an electronic digital display type scale, in which, if the following weighing operation is effected during the display holding operation, holding the display of the data of the preceding load is automatically released and the data of the present load is automatically displayed.

A third object of the invention is to provide a display holding device for an electronic digital display type scale, in which, when a part of a load applied to the weighing section is removed so that the weight of the remaining load becomes less than a predetermined value, various data representative of, for instance, the weight and price of the load, which have been displayed by the data display means, are automatically held to be further displayed thereby.

A fourth object of the invention is to provide a display holding device for an electronic digital display type scale, in which, when a part of a load applied to the weighing section is removed so that the weight of the remaining load becomes less than a predeterminwed value, a data display holding operation is started, and the data display holding operation can be quickly released by operating a predetermined key.

The novel features which are considered characteristic of this invention are set forth in the appended claims. This invention itself, however, as well as other objects and advantages thereof will be best understood by reference to the following detailed description of illustrative embodiments, when read in conjunction with the accompanying drawings.

BRIEF DESCRIPTION OF THE DRAWINGS

In the accompanying drawings:

FIGS. 1, 2 and 3 are block diagrams showing first, second and third embodiments of this invention, respectively.

DETAILED DESCRIPTION OF THE INVENTION

Figure 1:
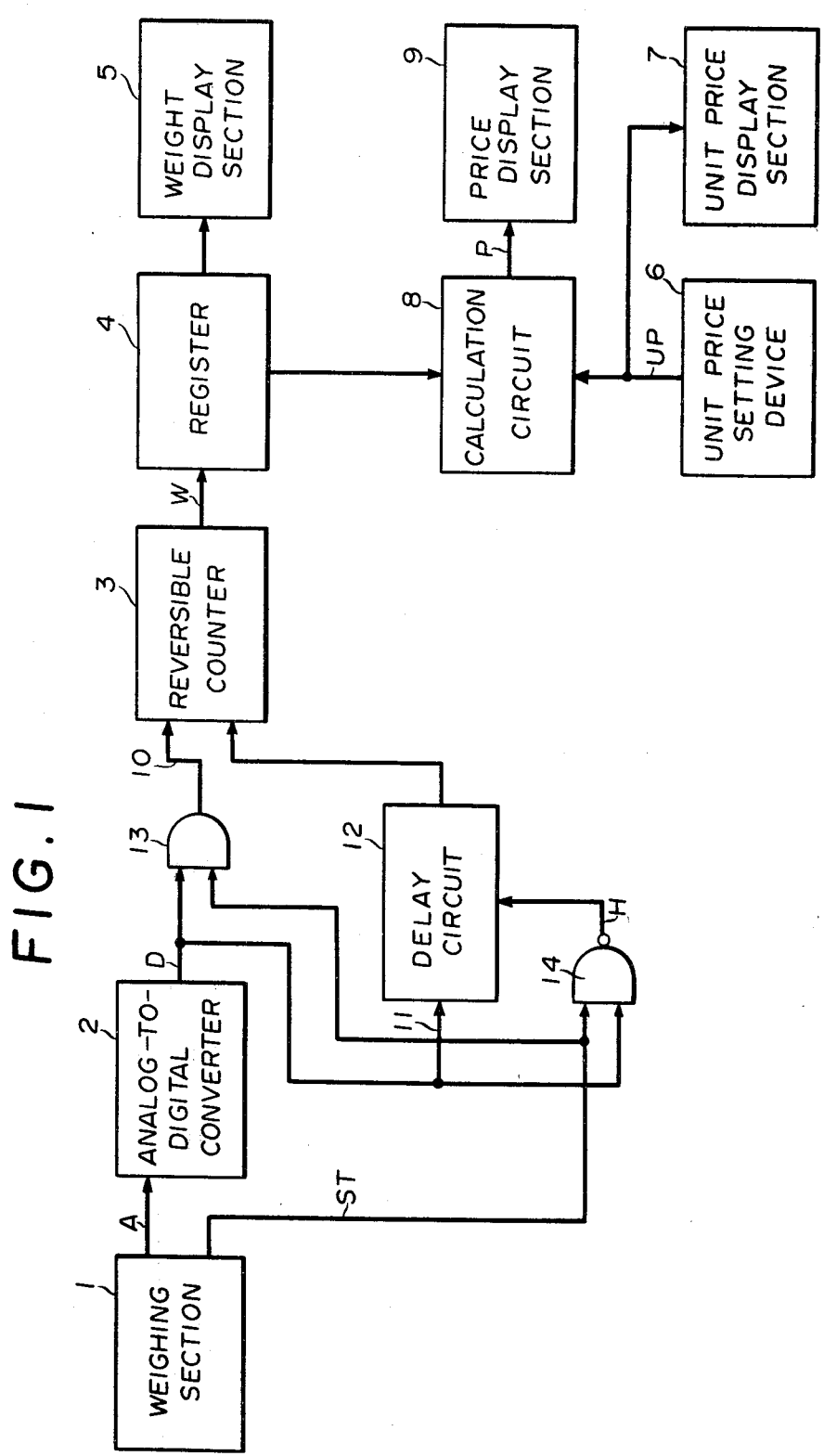

A first embodiment of this invention will be described with reference to FIG. 1.

A weighing section 1 for testing the weight of a thing such as a commodity is made up of, for instance, load cells and operates to detect the weight of a thing, or a load to provide an analog signal A corresponding thereto. The analog signal A thus provided is applied to an analog-to-digital converter 2 where it is converted into a digital signal D. This digital signal D is applied to a first input terminal of an AND gate 13, to a second input terminal of which a start signal ST outputted by the weighing section 1 is applied. This start signal ST is outputted when the weighing section operates in a positive direction, that is, the analog signal A goes in a positive direction, or when the weighing section operates in the positive direction and the weight of the load being tested is stabilized (or when the analog signal A reaches a value corresponding to the weight of the load), but the start signal ST is not outputted when the weighing section operates in a negative direction.

The output terminal of the AND gate 13 is connected through a line 10 to a reversible counter 3, which counts the aforementioned digital signal D to output a weight signal W. The weight signal W is applied to a register 4, whereby it is displayed on a weight display section 5. The weight signal W is further applied to a calculation circuit 8 through the register 4.

In FIG. 1, reference numeral 6 designates a unit price setting device, which outputs a unit price signal UP when a unit price is set thereby. The unit price signal UP is displayed on a unit price display section 7 and is applied to the calculation circuit 8. Thus, in the calculation circuit 8, the weight signal W and the unit price signal UP are subjected to multiplication thereby to provide a price signal P which is displayed on a price display section 9. The digital signal D from the analog-to-digital converter 2 (hereinafter referred to merely as an A-D converter 2, when applicable) is applied through a line 11 to a delay circuit made up of, for instance, a counter and a timer, so that the digital signal D outputted by the A-D converter 2 is counted and stored in the delay circuit 12. The digital signal D from the A-D converter 2 and the start signal ST from the weighing section 1 are applied to first and second input teminals of a NAND gate 14, respectively, which in turn outputs a hold signal H (that is, the NAND gate 14 being a hold signal generating circuit). The hold signal H is applied to the delay circuit 12, whereupon the delay circuit 12 is placed in an operable state for a predetermined period of time, for instance ten (10) seconds, so that the digital signal D (total) stored in the delay circuit 12 is continuously fed to the reversible counter 3 for the predetermined period of time. If the NAND gate 14 is closed to suspend the application of the hold signal H even before the predetermined period of time is ended, the operation of the delay circuit 13 is stopped.

The operation of the display holding device thus organized will be described.

First of all, a unit price is set by the unit price setting device 6 to provide the unit price signal UP, which is applied to the calculation section 8 and the unit price display section 7. Therefore, the unit price signal UP is stored in the calculation section 8 on the one hand and is displayed on the unit price display section 7 on the other hand. Then, a thing, or a load, is weighed by the weighing section 1, as a result of which the analog signal A corresponding to the weight of the load is outputted by the weighing section 1. The analog signal A is applied to the A-D converter 2, where it is converted into the digital signal D which is applied to the AND gate 13. In weighing the load, the weighing section 1 goes in the positive direction and thereafter the weighing operation of the weighing section 1 is stabilized. During this period, the start signal ST is provided by the weighing section 1 and is applied to the AND gate 13. As a result, the output of the AND gate 13 is applied through the line 10 to the reversible counter 3, which in turn applies the weight signal W to the register 4. The weight signal W is stored in the register 4 and the weight of the load is displayed on the weight display section 5. The weight signal W is applied to the calculation section 8, where the weight signal W and the unit price signal UP are subjected to multiplication to obtain the price signal P, which is displayed on the price display section 9. The digital signal D outputted by the A-D converter 2 is further applied to the delay circuit 12 through the line 11, where it is counted and stored.

When the load is removed from the weighing section 1 after the completion of the weighing operation, the weighing section 1 goes in the negative direction, as a result of which the application of the start signal ST is suspended. Therefore, the AND gate 13 is closed so that no output is provided through the line 10. At the same time, the NAND gate 14 is opened to output the hold signal H, which is applied to the delay circuit 12. Thus, the delay circuit 12 is enabled for the predetermined period of time so that the sum of the outputs of the A-D converter 2, i.e., the signal corresponding to the weight of the load applied to the weighing section 1 is continuously supplied to the reversible counter 3 for the predetermined period of time, for instance ten seconds. That is, the weight signal W corresponding to the weight of the load is maintained fed to the register 4 for ten seconds after the load has been removed from the weighing section 1. Accordingly, the weight and price of the load are maintained displayed on the display section 5 and 9 for the predetermined period of time.

After ten seconds, the operation of the delay circuit 12 is suspended, and accordingly the supply of the signal to the reversible counter 3 from the delay circuit 12 is suspended. As a result, holding the weight and price signals of the load is released.

Thus, the weight and price are maintained displayed on the display sections 5 and 9 for the predetermined period of time after the removal of the load from the weighing section 1; and after the prdetermined period of time the holding of the weight and price signals is automatically released. Accordingly, the device according to the invention is considerably convenient for the user, and yet the device can be readily and effectively used without particular or additional operations.

If, before the data holding time is over, that is, under the condition that the weight and price of the present load (hereinafter referred to as "the first load" when applicable) are still displayed on the display sections 5 and 9, the next load (hereinafter referred to as "the second load" when applicable) is applied to the weighing section 1 so as to be weighed immediately, then the analog signal A representative of the second load is outputted thereby and is applied to the A-D converter 2, where it is converted into a digital signal D. The digital signal D is applied to the AND gate 13 while the start signal ST of the second load is applied to the AND gate 13. As a result, the AND gate 13 is opened. Therefore, the signal corresponding to the second load is applied through the AND gate 13 and the line 10 to the reversible counter 3. At the same time, the NAND gate 14 is closed, and therefore the hold signal H outputted by the NAND gate 14 is eliminated, and the operation of the delay circuit 13 is suspended. Thus, the digital signal D which has been applied to the reversible counter 3 from the delay circuit 13 is eliminated. Accordingly, holding the weight and price data of the first load is automatically released, and instead the weight and price data of the second load are displayed on the display sections 5 and 9. As is apparent from the above description, in the case where the second load is applied to the weighing section, holding the weight and price data of the first load is released even during the first load's data holding period, and the weight and price of the second load can be automatically displayed. Thus, the scale according to the invention can weigh loads with high efficiency.

The feature of the first embodiment of this invention resides in that, as was described above, when the load is removed from the weighing section, the hold signal is automatically outputted to maintain the contents displayed on the data display sections for the predetermined period of time, and after the lapse of the predetermined period of time, the hold signal is eliminated automatically. Accordingly, as the display of various data such as the weight and price of a load are maintained automatically for the predetermined period of time even if the load is removed from the weighing section, it is unnecessary to store each of the various data, that is, the data can be visually confirmed. Thus, the device according to the invention is convenient in use. Furthermore, the operation of holding these data is automatically released after it passes the predetermined period of time. That is, a particular operation is unnecessary to release the operation of holding the data. Accordingly, the device can be readily and quickly operated, so that weighing loads can be achieved with high efficiency.

In addition, if the second load is applied even during the first load's data holding period, holding the data of the first load is released and instead the data of the second load are displayed, as was described above. Therefore, the weighing of the second load can be quickly achieved, and yet no particular operation is required to do so. Accordingly, the electronic digital display type scale equipped with the display holding device according to the invention is simpler and faster in operation, and can achieve efficient weighing.

Figure 2:
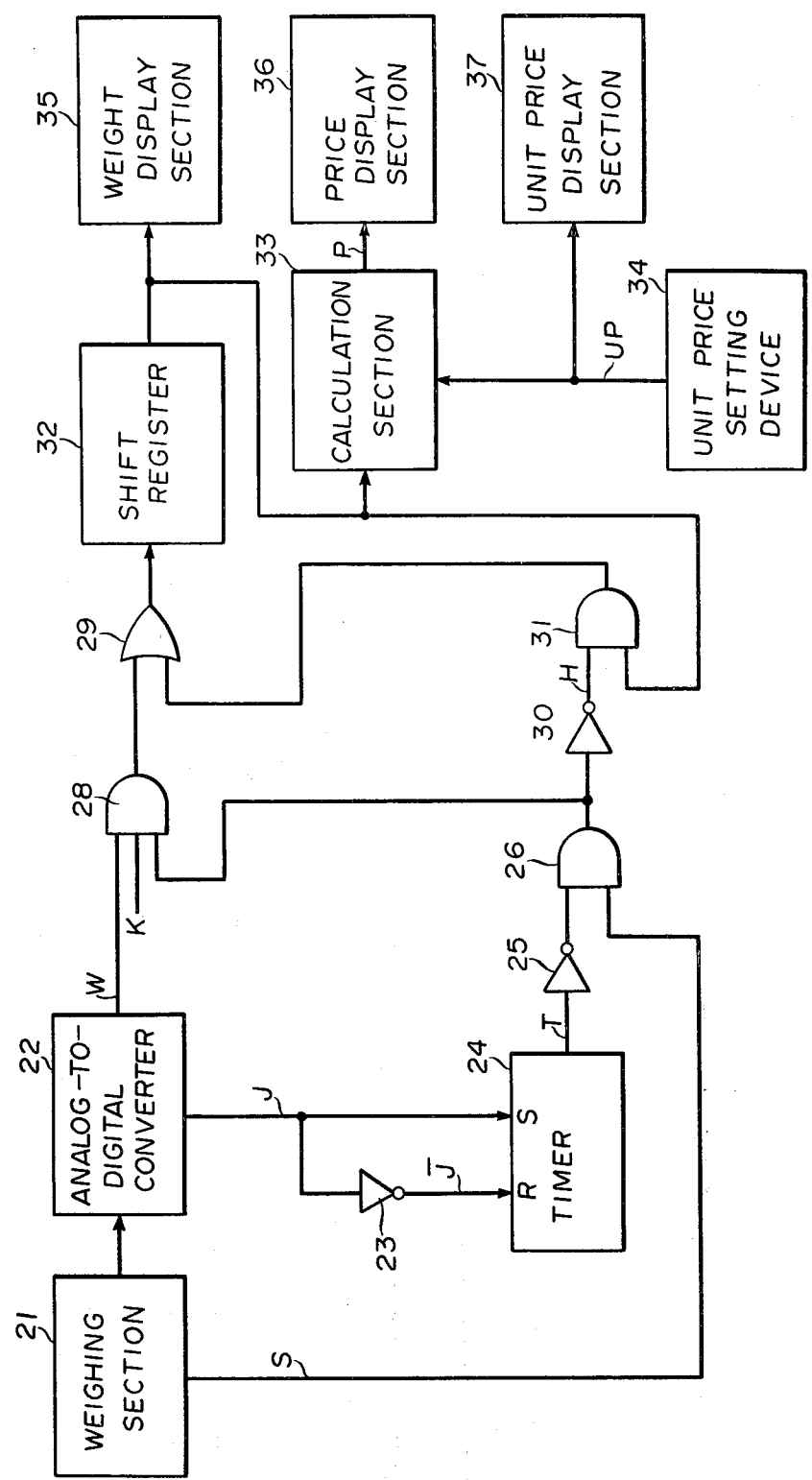

A second embodiment of the invention will be described with reference to FIG. 2.

A weighing section 21 comprising load cells operates to weigh a thing, or a load, to provide an analog signal A corresponding to the weight of the load. The analog signal A is applied to an analog-to-digital converter 22 (hereinafter referred to as "A-D converter 22" when applicable) where it is converted into an analog data, namely, a conversion load signal W. The A-D converter 22 includes a reversible counter (not shown). The aforementioned conversion load signal W is a signal representative of the contents of the reversible counter. The signal W is applied to a first input terminal of an AND gate 28, to the second input terminal of which a control signal C outputted by an AND gate 26 is applied. A signal J (described later) from the A-D converter 22 is applied through a timer 24 and inverters 23 and 25 to a first input terminal of the AND gate 26, while a stabilization signal S from the weighing section 21 is applied to a second input terminal of the AND gate 26.

The stabilization signal S is provided as a signal at a binary logical level "1" by the weighing section 21 when the analog signal A outputted by the weighing section 21 in response to the weight of the load weighed thereby becomes stable, i.e. when the weighing section 21 is electrically at rest.

The output of the AND gate 28, that is, a signal synchronous with the conversion load signal W is applied through an OR gate 29 to a shift register 32, where it is temporarily stored. The output of the shift register 32 is applied to a weight display section 35 where it is displayed, and the output of the shift register 32 is further applied to a first input terminal of a calculation section 33. A unit price signal UP representative of a unit price set by a unit price setting device 34 comprising a ten-key assembly is applied to a second input terminal of the calculation section 33. In this calculation section 33, a price calculating operation is carried out with the conversion load signal W and the unit price signal UP, so that a price is calculated and a price signal P representative of the price thus calculated is outputted. The price signal P is supplied to a price display section 36 to display the price. The aforementioned unit price signal UP is applied to a unit price display section 37, where it is displayed.

A hold signal (H) forming circuit and a hold signal releasing circuit, which are essential in the second embodiment of the invention, will be described.

The aforementioned signal J is a detection signal outputted, as a signal "1", when the data in the reversible counter in the A-D converter 22 is changed from data greater than the data representing, for instance, a weight of 10 g to data smaller than that. This signal J is applied to the set input terminal S of the timer 24 and is applied to the reset input terminal R thereof through an inverter 23. That is, a signal J̄ obtained by inverting the signal J is applied to the reset input terminal R of the timer 24. This timer 24 is so designed that it operates for ten (10) seconds (for instance) after the signal J ("1") is applied to the set input terminal S, and its operation signal (as elapsed time signal) T (or a "1" signal) is applied to the first input terminal of the AND gate 26 through an inverter 25. Applied to the second input teminal of the AND gate 26 is the above-described stabilization signal S. The control signal C provided by the AND gate 26 is applied through an inverter 30 to a first input terminal of an AND gate 31, to the second input terminal of which the output signal of the shift register 32 is applied. The output signal of the inverter 30 is the aforementioned hold signal H. When the hold signal H is at the logical level "1", that is, only during the operation of the timer 24 (for ten seconds) or only when the stabilization signal S is not provided, the AND gate 31 is opened, whereby the output of the shift register 32 (that is, the conversion load signal W for the load which is firstly applied to the weighing section 21) is held by a holding circuit comprising the AND gate 31, the OR gate 29, and the shift register 32. A signal K is applied to a third input terminal of the AND gate 28. This signal K is outputted as a "0" signal by a decision section (not shown) for the time interval which elapses from the time instant that the analog signal A provided by the weighing section 21 starts to go in the negative direction after the removal of the load from the weighing section 21 until the analog signal A stops becomes stable (or the stabilization signal S is outputted and raised to the logical level "1"). It is prevented by this signal K that the final weighing value of the load stored in the shift register 32 before the removal of the load is cleared upon removal of the load.

The operation of the display holding device according to the second embodiment of the invention will be described.

Before a thing, or a load, is weighed by the weighing section 1, its unit price is set by the unit price setting device 34 to output the unit price signal UP. The unit price signal UP is applied to the calculation section 33 and the unit price display section 37, as a result of which the unit price thus set is stored in the calculation section 33 and displayed on the unit price display section 37. Then, a load having a weight of, for instance, 100 g is applied to the weighing section 21, as a result of which an analog signal A corresponding to the weight of the load is outputted by the weighing section 21. This analog signal A is applied to the A-D converter 22. Thus, the contents of the reversible counter in the A-D converter 22 are changed with the analog signal A, and a signal representative of the resultant contents is outputted as the digital conversion load signal W. The conversion load signal W is applied to the AND gate 28.

The signal K applied to the third input terminal of the AND gate 28 is at "1". However, as the stabilization signal S is at "0" before the weighing operation becomes stable, during this period the control signal C of the AND gate 26, applied to the second input terminal of the AND gate 28, is at "0". Therefore, the conversion load signal W is not outputted by the AND gate 28. When the weighing operation of the weighing section 1 becomes stable, the stabilization signal S is raised to "1" and is applied to the AND gate 26. During this period, the signal J is at "0", and the signal T ("0") is applied through the inverter 25 to the AND gate 26 as a "1" signal. Therefore, the control signal C of the AND gate 26 is applied, as a "1" signal, to the AND gate 28. As a result, the conversion load signal W representative of the weight 100 g is outputted by the AND gate 28. The signal W thus outputted is applied through the OR gate 29 to the shift register 32, where it is stored. The conversion load signal W stored in the shift register 32 is applied to the weight display section 35, where the weight 100 g is displayed. The signal W is further applied to the calculation section 33, where it is multiplied by the unit price signal UP to obtain the price of the load. Then, the price signal P is displayed on the price display section 36.

Under this condition, the timer 24 is not operated yet, and the signal T is at "0". Accordingly, the control signal C outputted by the AND gate 26 is inverted by the inverter 30 into a "0" signal. Thus, the hold signal H which is the output signal of the inverter 30 is at "0", and accordingly the hold circuit is not operated yet.

If a part of the load 100 g in weight, for instance, 95 g is removed from the load 100 g so that the weight of the remaining load is less than 10 g, then the analog signal A outputted by the weighing section 21 is changed in the negative direction, while the level of the stabilization signal is changed to "0". Therefore, the control signal C from the AND gate 26 is set to "0". On the other hand, the signal K is maintained at "0" until the stabilization signal S is changed to the "1" signal after the removal of the part of the load. Accordingly, the conversion load signal W is not provided by the AND gate 28. A control signal C at "0", being inverted by the inverter 30, provides the hold signal H at "1". Therefore, the hold circuit is established by the AND gate 31, the OR gate 29 and the shift register 32.

Soon after the removal of the part of the load, the weighing operation of the weighing section 21 becomes stabilized, so that it is detected that the remaining load is less than 10 g, while the stabilization signal S is set to "1". Upon this detection, the signal J is raised to "1", thereby to cause the timer 24 to operate for ten seconds. During this period, the signal T is maintained at "1", and the output of the inverter 25 is therefore maintained at "0". Accordingly, the control signal C of the AND gate 26 is set to "0", whereby similarly as in the above-described case the hold signal H at "1" is outputted and the hold circuit is established.

Thus, as soon as the part of the load is removed, the hold circuit is established, and the final weight value (100 g) stored in the shift register 32 is maintained held even after the removal of the part of the load, as a result of which the weight is kept displayed on the weight display section 35 which the price is kept displayed on the price display section 36.

After the ten seconds has passed, the signal T is set to "0", and the output of the inverter 25 is therefore set to "1". As in this case the stabilization signal S is at "1", the output of the AND gate 26 is raised to "1". As a result, the output of this inverter 30, namely, the hold signal H is set to "0", and therefore the hold circuit is deestablished. That is, the contents in the shift register is cleared, and the hold operation is automatically released.

As is apparent from the above description, when, after a load has been weighed, a part of the load is removed more than a predetermined weight, the hold circuit is established so as to automatically hold the signals representative of the weight and price of the load for the predetermined period of time; however, after it passes the predetermined period of time, the hold operation is automatically released. It goes without saying that the same effect is obtained even if the remaining load's weight is 0 g by removing all of the load 100 g.

A case where the remaining load's weight is not less than the predetermined weight (10 g) by removing, for instance, 50 g from the load (100 g) will be described. In this case, immediately after the removal of the part of the load, the stabilization signal is set to "0", and therefore the hold operation is carried out. However, as the signal J is maintained at "0", that is, it is not outputted, the hold operation is released when the stabilization signal S is raised to "1" after the stabilization of the weighing operation, and therefore the weight 50 g of the remaining load instead of the weight of the initial load is displayed on the weight display section 35. In the above description, the weight of the remaining load is set to less than 10 g (the predetermined weight is 10 g); however, it is not limited thereto or thereby.

In the second embodiment of the invention, as was described above, when the weight of a load applied to the weighing section is reduced to less than the predetermined weight, the hold signal is automatically produced to hold the contents displayed on the data display sections. Therefore, it is possible to automatically hold the contents displayed for a period of time actually required in use. Furthermore, the hold operation is automatically released after the predetermined period of time, that is, no particular operation is required to release the hold operation for weighing the following load. Thus, the device according to the invention can be readily and quickly operated. Thus, it can be said that the device is excellent in efficiency.

Shown in FIG. 3 is a third embodiment of this invention. More specifically, FIG. 3 illustrates a display holding device is an electronic digital display type scale, in which, when a part of a load applied to a weighing section is removed therefrom whereby the weight of the remaining load is less than a predetermined weight, a hold operation is started, and the hold operation thus started is released by operating a predetermined key.

For this purpose, the display holding device is so designed that in the device according to the above-described second embodiment the inverter 23 and the timer 24 are eliminated, the signal J described before is applied through the inverter 25 to the AND gate 26, and a signal $\overline{R}$ obtained by applying to an inverter 38 an operation signal (or a reset signal R) provided by operating a reset button (not shown) in a unit price setting device 34 is applied to a third input terminal of an AND gate 31. The remaining components are similar to those which have been previously described with reference to FIG. 2 and are therefore similarly numbered. Therefore, these remaining component will not be described in detail.

In operation, prior to weighing a thing, or a load, by the weighing section 21, its unit price is set by the unit price setting device 34, as a result of which a unit price signal UP is provided to be applied to the calculation section 33 and the unit price display section 37, whereby the unit price is stored in the calculation section 33 and is displayed on the unit price display section 37. Then, a load, for instance, 100 g in weight is applied to the weighing section 21, whereby an analog signal A representative of the weight of the load is produced by the weighing section 21. This analog signal A is applied to the A-D converter 22. The contents of the reversible counter (not shown) in the A-D converter 22 is varied with the analog signal A, and a signal representative of the resultant contents of the reversible counter is outputted, as a conversion load signal W, by the A-D converter 22, and is applied to the AND gate 28.

The signal K applied to the third input terminal of the AND gate 28 is at "1". However, as the stabilization signal S is at "0" before the weighing operation becomes stable, during this period the control signal C of the AND gate 26, applied to the second input terminal of the AND gate 28, is at "0". Therefore, the conversion load signal W is not outputted by the AND gate 28. When the weighing operation of the weighing section 21 becomes stable, the stabilization signal S is raised to "1" and is applied to the AND gate 26. During this period, the signal J is at "0". This signal J is applied through the inverter 25 to the AND gate 26. Therefore, the control signal C of the AND gate 26 is applied, as a "1" signal, to the AND gate 28. As a result, the conversion load signal W representative of the weight 100 g is outputted by the AND gate 28. The signal W thus outputted is applied through the OR gate 29 to the shift register 32, where it is stored. The conversion load signal W stored in the shift register 32 is applied to the weight display section 35, where the weight 100 g is displayed. The signal W is further applied to the calculation section 33, where it is multiplied by the unit price signal UP to obtain the price of the load. Then, the price signal P is displayed on the price display section 36.

Under this condition, the control signal C outputted by the AND gate 26 is inverted by the inverter 30 into a "0" signal. Thus, the hold signal H which is the output signal of the inverter 30 is at "0", and accordingly the hold circuit is not operated yet.

If a part of the load 100 g in weight, for instance, 95 g is removed from the load 100 g so that the weight of the remaining load is less than 10 g, then the analog signal A outputted by the weighing section 21 is changed in the negative direction, while the level of the stabilization signal S is changed to "0". Therefore, the control signal C from the AND gate 26 is set to "0". On the other hand, the signal K is maintained at "0" until the stabilization signal S is changed to the "1" signal after the removal of the part of the load. Accordingly, the conversion load signal W is not provided by the AND gate 28. A control signal C at "0", being inverted by the inverter 30, provides the hold signal H at "1". Therefore, the hold circuit is established by the AND gate 31, the OR gate 29 and the shift register 32.

Soon after the removal of the part of the load, the weighing operation of the weighing section 21 becomes stabilized, so that it is detected that the remaining load is less than 10 g, while the stabilization signal S is set to "1". Upon this detection, the signal J is raised to "1", and the output of the inverter 25 is set to "0". Accordingly, the control signal C is set to "0". Accordingly, similarly as in the above-described case, the hold signal H at "1" is outputted and the hold circuit is established.

Thus, as soon as the part of the load is removed, the hold circuit is established, and the final weight value (100 g) stored in the shift register 32 is maintained held even after the removal of the part of the load, as a result of which the weight is kept displayed on the weight display section 35 while the price is kept displayed on the price display section 36.

If, when it becomes unnecessary to continue the hold operation, the aforementioned reset button is operated, then the reset signal R at "1" is outputted, as a result of which the output of the inverter 38 is set to "0" so as to close the AND gate 31. Thus, the above-described hold circuit is deestablished, whereby the contents of the shift register 32 is cleared.

As is apparent from the above description, when, after a load is weighed, a part of the load is removed therefrom so that the weight of the remaining load is less than the predetermined weight (10 g), the hold circuit is operated to automatically hold the signals representative of the weight and price thereof, and yet the hold operation is released by operating the reset button. It goes without saying that the same effect is obtained even if the weight of the remaining load is zero gram by removing all of the load.

In the case where the weight of the remaining load is not less than the predetermined weight (10 g), by removing, for instance, 50 g from the load (100 g), immediately after the removal of the part of the load, the stabilization signal S is set to "0", and therefore the hold operation is carried out. However, as the signal J is maintained at "0", that is, it is not outputted, the hold operation is released when the stabilization signal S is raised to "1" after the stabilization of the weighing operation, and therefore the weight 50 g of the remaining load instead of the weight of the initial load is displayed on the weight display section 35.

In the third embodiment of the invention, the particular set button is provided in the unit price; however, it may be replaced by a ten-key assembly (or a numeral key assembly) for setting a unit price, a clear key or a tare weight setting key which is used to set a tare weight in the electronic scale. Furthermore, in the above description, the weight of the remaining load is set to less than 10 g (the predetermined weight is 10 g); however, it is not limited thereto or thereby.

In the third embodiment of the invention, as was described above, when the weight of a load applied to the weighing section is reduced to less than the predetermined weight by removing a part of the load therefrom, the hold signal is automatically produced to hold the contents displayed on the data display sections. Therefore, it is possible to automatically hold the contents displayed for a period of time actually required in use, and to do so no particular operation is required. Therefore, the device can be readily and quickly operated. Furthermore, as the hold operation can be released by operating the predetermined key, the following weighing operation can be achieved quickly. Thus, according to the invention, the weighing operation can be efficiently carried out.

The embodiments of the invention have been described with respect to the case where, among various data as to a load weighed by the weighing section, data as to the weight and price of the load are displayed and the display is maintained held; however, it should be noted that the invention is not limited thereto or thereby. That is, the technical concept of the invention may be applied to the case where one of the signals representative of the weight and price is maintained held for display or the case where the display of any one of various data as to the weight, number, unit price, etc. of a load obtained by using an electronic digital count type scale is maintained held.

What is claimed is:

1. In an electronic digital display type scale in which the weight of a load applied to a weighing section is converted into an electrical signal so that various data representative of, for instance, the weight and price of the load are displayed by data display means, the improvement comprises a display holding device which, when a part of said load is removed therefrom, outputs a hold signal automatically to hold said various data displayed by said data display means for a predetermined period of time, and when it has passed said predetermined period of time, the holding operation is automatically released.

2. A device as claimed in claim 1, in which said hold signal is automatically produced when all of said load applied to said weighing section is removed.

3. A device as claimed in claim 1, in which data representative of the weight, unit price and price of said load applied to said weighing section are displayed by said data display means, and when said hold signal is outputted, an optional one or ones among said data representative of the weight, unit price and price of said load is or are maintained held.

4. A device as claimed in claim 1, which comprises: a weighing section which, when a load is applied thereto, outputs an analog signal corresponding to the weight of said load, and while said analog signal goes in a positive direction or when said analog signal reaches a value corresponding to said load after said analog signal goes in the positive direction, outputs a start signal; an analog-to-digital converter for converting said analog signal into a digital signal; a counter for counting said digital signal to provide a weight signal; a register for storing a count value of said counter; a unit price setting device for setting the unit price of said load to output a unit price signal; a calculation circuit operating to receive a count value signal stored in said register and said unit price signal to calculate the price of said load and to output a price signal; data display means for displaying said count value signal, unit price signal and price signal; a hold signal generating circuit which receives said digital signal and start signal, and when the provision of said start signal is suspended, generates a hold signal; and a delay circuit which receives and counts said digital signal and stores the resultant count value, and which outputs said stored count value for a predetermined period of time after the generation of said hold signal.

5. A device as claimed in claim 4, in which said delay circuit comprises a counter and a timer.

6. In an electronic digital display type scale in which the weight of a load applied to a weighing section is converted into an electrical signal so that various data representative of, for instance, the weight and price of the load are displayed by data display means, the improvement comprises a display holding device which, when a part of a first load applied to said weighing section is removed therefrom, automatically outputs a hold signal so that the data of said first load is held displayed by said data display means for a predetermined period of time, and when a second load is nextly applied to said weighing section before said predetermined period of time is over, displaying the data of said first load is released and instead the data of said second load is displayed by said data displaying means.

7. A device as claimed in claim 6, which comprises: a weighing section which, when a load is applied thereto, outputs an analog signal corresponding to the weight of said load, and while said analog signal goes in a positive direction or when said analog signal reaches a value corresponding to said load after said analog signal goes in the positive direction, outputs a start signal; an analog-to-digital converter for converting said analog signal into a digital signal; a counter for counting said digital signal to provide a weight signal; a register for storing a count value of said counter; a unit price setting device for setting the unit price of said load to output a unit price signal; a calculation circuit operating to receive a count value signal stored in said register and said unit price signal to calculate the price of said load and to output a price signal; data display means for displaying said count value signal, unit price signal and price signal; a hold signal generating circuit which receives said digital signal and start signal, and when the provision of said start signal is suspended, generates a hold signal; and a delay circuit which receives and counts said digital signal and stores the resultant count value, and which outputs said stored count value for a predetermined period of time after the generation of said hold signal.

8. A device as claimed in claim 7, in which said delay circuit comprises a counter and a timer.

9. In an electronic digital display type scale in which the weight of a load applied to a weighing section is converted into an electrical signal so that various data representative of, for instance, the weight and price of the load are displayed by data display means, the improvement comprises a display holding device which, when a part of said load applied to said weighing section is removed therefrom and the weight of the remaining load becomes less than a predetermined value, outputs a hold signal so that the data displayed by said data display means in correspondence to the weight of said load are maintained held for a predetermined period of time.

10. A device as claimed in claim 9, in which data representative of the weight, unit price and price of said load applied to said weighing section are displayed by said data display means, and upon provision of said hold signal an optional one or more among said data representative of the weight, unit price and price of said load is or are maintained held.

11. A device as claimed in claim 9, which comprises: a weighing section which, when a load is applied thereto, outputs an analog signal corresponding to the weight of said load, and when said analog signal is maintained unchanged, outputs a stabilization signal; an analog-to-digital converter which operates to convert said analog signal into a digital signal, and to output a detection signal when said digital signal is changed from a signal greater than an predetermined value to a signal smaller than said predetermined value; a timer which starts an elapsed time operation by being set by said detection signal and provides an elapse time signal for a predetermined period of time after the start of the elapsed time operation; a hold signal generating circuit which, receiving said stabilization signal and elapsed time signal, generates a hold signal while said stabilization signal is not provided or while said elapsed time signal is outputted; a register for receiving and storing said digital signal; a hold circuit for holding the signal stored by said register while said hold signal is generated; a unit price setting device for setting the unit price of said load to provide a unit price signal; a calculation circuit which, receiving said signal stored in said register and said unit price signal, calculates the price of said load to output a price signal; and data display means for displaying said signal stored in said register, said unit price signal and said price signal.

12. In an electronic digital display type scale in which the weight of a load applied to a weighing section is converted into an electrical signal so that various data representative of, for instance, the weight and price of the load are displayed by data display means, the improvement comprises a display holding device which, when a part of said load applied to said weighing section is removed therefrom and the weight of the remaining load becomes less than a predetermined value, outputs a hold signal so that the data displayed by said data display means in correspondence to the weight of said load are maintained held, and in which the holding operation is released by a predetermined key operation.

13. A device as claimed in claim 12, in which data representative of the weight, unit price and price of said load applied to said weighing section are displayed by said data display means, and upon provision of said hold signal an optional one or ones among said data representative of the weight, unit price and price of said load is or are maintained held.

14. A device as claimed in claim 12, which comprises: a weighing section which, when a load is applied thereto, outputs an analog signal corresponding to the weight of said load, and when said analog signal is maintained unchanged, outputs a stabilization signal; an analog-to-digital converter which operates to convert said analog signal into a digital signal, and to output a detection signal when said digital signal is changed from a signal greater than an predetermined value to a signal smaller than said predetermined value; a hold signal generating circuit which, receiving said stabilization signal and detection signal, generates a hold signal which said stabilization signal is not provided or while said detection signal is outputted; a register for receiving and storing said digital signal; a hold circuit for holding the signal stored by said register while said hold signal is generated; a unit price setting device for setting the unit price of said load to provide a unit price signal; a calculation circuit which, receiving said signal stored in said register and said unit price signal, calculates the price of said load to output a price signal; data display means for displaying said signal stored in said register, said unit price signal and said price signal; and a key for releasing the holding operation of said hold circuit.

15. A device as claimed in claim 14, in which said key is a reset button provided in said unit price setting device.

16. A device as claimed in claim 14, in which said key is at least one selected from the group consisting of a ten-key, a clear key and a tare weight setting key provided in said unit price setting device.

* * * * *